US009185241B2

(12) United States Patent
Valobra et al.

(10) Patent No.: US 9,185,241 B2
(45) Date of Patent: Nov. 10, 2015

(54) POWER CONSUMPTION SIMULATOR FOR MULTI-FUNCTION DEVICES

(71) Applicant: Xerox Corporation, Norwalk, CT (US)

(72) Inventors: Pascal Valobra, Webster, NY (US);
Lionel Cazenave, Brooklyn, NY (US);
Victor Ciriza Lope, Saint Marting d'Uriage (FR)

(73) Assignee: Xerox Corporation, Norwalk, CT (US)

( * ) Notice: Subject to any disclaimer, the term of this patent is extended or adjusted under 35 U.S.C. 154(b) by 43 days.

(21) Appl. No.: 13/793,012

(22) Filed: Mar. 11, 2013

(65) Prior Publication Data

US 2014/0253935 A1 Sep. 11, 2014

(51) Int. Cl.
| G06F 3/12 | (2006.01) |
| H04N 1/00 | (2006.01) |
| G06F 1/32 | (2006.01) |
| G06F 17/50 | (2006.01) |

(52) U.S. Cl.
CPC .......... *H04N 1/00031* (2013.01); *G06F 1/3284* (2013.01); *G06F 17/5036* (2013.01); *G06F 2217/78* (2013.01); *Y02B 60/1267* (2013.01)

(58) Field of Classification Search
CPC .................................................. H04N 1/00031
See application file for complete search history.

(56) References Cited

U.S. PATENT DOCUMENTS

| 8,230,248 B2 | 7/2012 | Dance et al. | |
| 2011/0318044 A1* | 12/2011 | Matsumoto | 399/88 |
| 2012/0053868 A1* | 3/2012 | Matsumoto | 702/61 |
| 2012/0053885 A1* | 3/2012 | Kato | 702/128 |
| 2013/0031385 A1* | 1/2013 | Seto | 713/300 |

OTHER PUBLICATIONS

Jean-Baptiste Durand et al., "Optimization of power consumption and device availability based on point process modelling of the request sequence", Journal of the Royal Statistical Society, Series C (Applied Statistics), vol. 62, Part 2, 2013, pp. 151-165.
Victor Ciriza et al., "A statistical model for optimizing power consumption of printers", Joint Meeting of Statistical Society of Canada and the Societe Francaise de Statistique, May 25, 2008, pp. 227-227.

(Continued)

*Primary Examiner* — Peter K Huntsinger
*Assistant Examiner* — Idowu O Osifade
(74) *Attorney, Agent, or Firm* — Fox Rothschild LLP

(57) ABSTRACT

The present disclosure teaches a device and method for simulating energy consumption by a multi-functional printing device. The device includes a processor and a computer readable memory, the memory including instructions for causing the processor to perform the method. The method includes loading an activity log comprising a plurality of jobs, loading a first strategy from a plurality of strategies, simulating each of the plurality of jobs at the printing device according to the first strategy, determining a first amount of power required by the printing device to perform the plurality of jobs, determining a second amount of power consumed by the printing device between performing the plurality jobs, creating a report including estimated power consumption by the multi-functional printing device to complete the plurality of jobs according to the first strategy, and causing the report to be displayed.

18 Claims, 4 Drawing Sheets

(56) References Cited

OTHER PUBLICATIONS

Timo Minartz, "Model and simulation of power consumption and power saving potential of energy efficient cluster hardware", Aug. 27, 2009, Heidelberg, retrieved from the internet: http://archiv.ub.uni-heidelberg,de/volltextserver/10951/1/master thesis.pdf.

Rakesh Kumar Pradhan et al., "Priority based Energy Efficient Dynamic Power Scaling", International Journal of Computer Applications (0975-8887), vol. 54, No. 12, Sep. 2012, pp. 37-41, Retrieved from the Internet: http://research.ijcaonline.org/volume54/number12/pxc3882484.pdf.

* cited by examiner

POWER CONSUMPTION SIMULATOR FOR MULTI-FUNCTION DEVICES

BACKGROUND

The present disclosure relates to simulating energy consumption. More specifically, the present disclosure relates to simulating energy consumption and determining one or more strategies for energy conservation.

Many office devices such as printers, copiers and multi-function devices (e.g., a single device capable of scanning, printing, faxing and/or copying) are capable of operating in one or more modes. For example, when a device is not used for a given period of time, the device may enter a "sleep" mode. During a sleep mode, various components in the device go into low power operation or are turned off completely. For example, a copier's fuser may be turned off, motor drives and controllers may be shut off, and communication interfaces may be put into a low power, low speed mode. Once the device receives a request to perform a specific function, the device may exit sleep mode and operate as normal.

Some office devices may also include one or more energy saving modes that are designed to use less power and other resources than normal operating mode while attempting to reduce any impact on the productivity of the office device. For example, an office device may include an economy print mode where less ink or toner is used. Similarly, an office device may include a batching print mode where a print job is only processed once a set number of print jobs (e.g., 20) print jobs are received by the device. This limits the number of times the office device is functioning in print mode, thereby reducing the overall power consumed and resources used.

During energy saving modes, the device uses less overall power as compared to normal operating mode and, thus, saves energy costs and various other resources. However, a user of the device has to endure performance losses associated with production losses from energy saving mode. In some instances, the production losses may be of a larger value than the energy or resource savings. As such, a user or an administrator for the device may disable energy saving mode as a means to reduce lost productivity.

Additionally, a multi-function device is capable of performing various tasks such as printing, scanning, faxing, and other similar tasks. To complete each task, the device progresses through various states. For example, a device in a sleep mode may receive a request to print a document. To print, the device must first exit or awake from sleep mode into an idle state where the request is processed. The device can then start printing the document. Once printing is complete, the device returns to idle mode for a period of time. If during the period of time no additional requests are received, the device returns to sleep mode.

Many modern office devices include sophisticated drivers or software configured to operate various functions of the device. Often, one or more drivers monitor energy consumption and power used by the device. However, the energy consumption is related solely to energy consumed performing a task. There is no measurement of the energy used or wasted during the transitions between the various states.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a device for simulating energy consumption by a multi-functional printing device. The device includes a processor and a computer readable medium operably connected to the processor. The computer readable medium containing a set of instructions configured to instruct the processor to load a activity log comprising a plurality of jobs; load a first strategy from a plurality of strategies; simulate performing, by the printing device, each of the plurality of jobs according to the first strategy; determine a first amount of power required by the printing device to perform the plurality of jobs; determine a second amount of power consumed by the printing device between performing the plurality jobs; create a report including estimated power consumption by the multi-functional printing device to complete the plurality of jobs according to the first strategy, wherein the estimated power consumption comprises the first amount of power and the second amount of power; and cause the report to be displayed.

In another general respect, the embodiments disclose a method of simulating energy consumption by a multi-functional printing device. The method includes loading, by a processing device, an activity log comprising a plurality of jobs; loading, by the processing device, a first strategy from a plurality of strategies; simulating, by the processing device, each of the plurality of jobs at the printing device according to the first strategy; determining, by the processing device, a first amount of power required by the printing device to perform the plurality of jobs; determining, by the processing device, a second amount of power consumed by the printing device between performing the plurality jobs; creating, by the processing device, a report including estimated power consumption by the multi-functional printing device to complete the plurality of jobs according to the first strategy, wherein the estimated power consumption comprises the first amount of power and the second amount of power; and causing, by the processing device, the report to be displayed.

DETAILED DESCRIPTION

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing and scanning, in which case such a device may be considered a multifunctional device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "printer driver" refers to a set of computer instructions operably configured to instruct a processor of a printing device to process and print a document or print job.

In order to improve power consumption estimation accuracy, the present disclosure defines methods and systems for modeling a device's energy behavior using machine state principles. Each function of a multi-function device may have one or more associated modules or sets of states that defines what individual tasks the device performs in order to successfully complete the function. The power consumption of one or more devices may be modeled according to a timeout strategy. This strategy may use a set of timeouts that may dynamically evolve over time. The strategy may make an analysis of various job activity records for one or more devices, and alter the set of timeouts at a given time for a particular device, to alter the power consumption at that device. Then, a simulator may run a job activity log for the updated set of timeouts, simulating all activities for the device, to determine the power consumption for that device using that specific set of timeouts.

Figure 1:
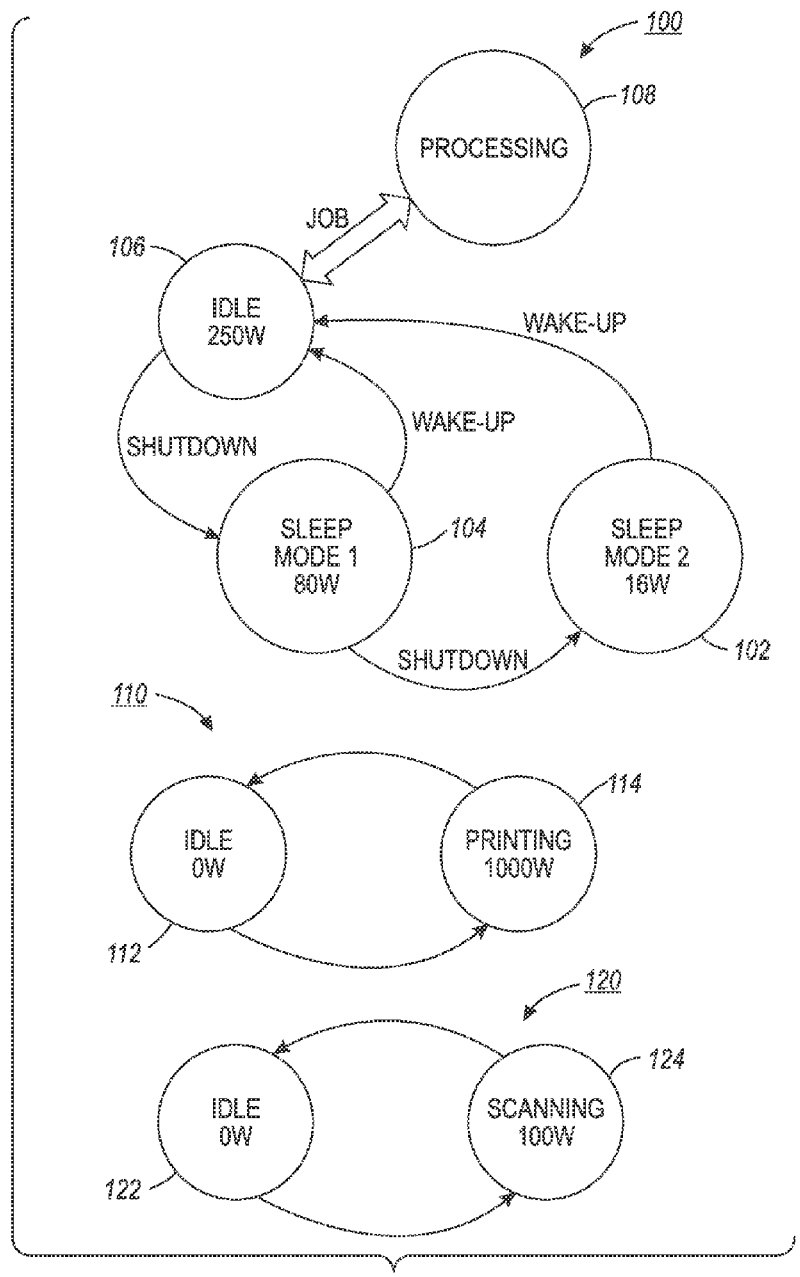
FIG. 1 depicts a set of illustrative state models for a multi-function device according to an embodiment.

FIG. 1 illustrates various sets of example state models organized into multiple modules. The various modules, when considered together, represent the operating characteristics of a specific device model.

A module 100 may represent a main operating module for the device. The module 100 illustrates the transitions between sleep modes and processing a job. Depending on the device, there may be multiple sleep modes, a first sleep mode the device enters after a short period of time without receiving a job (e.g., 10 minutes), and second sleep mode the device enters after a longer period of time without receiving a job (e.g., 1 hour). While in sleep mode 2, represented by state 102, the device may consume 16 W of power. Similarly, when in sleep mode 1, represented by state 104, the device may consume 80 W of power. Sleep mode 2 may further disable various features of the device such as a screen or user interface, a fuser or heating element, and other non-essential components, resulting in a lower power consumption.

When a job is received, the device wakes up and proceeds to an idle state 106. In idle state 106, the device may consume about 250 W of power. After idling, the device may process the job, represented by state 108. Depending on the type of job received, the power consumed may vary.

For example, module 110 shows the power consumption for a print job. The device may transition from an idle state 112 to a printing state 114, consuming approximately 1000 W. Similarly, module 120 shows the power consumption for scanning a document. The device may transition from an idle state 122 to a scanning state 124, consuming about 100 W.

It should be noted the power consumptions as shown in FIG. 1 are shown by way of example only. Additionally, the individual states shown in FIG. 1 are shown for illustrative purposes only, and a device may include more or fewer individual states for each function. For example, a device may only have one sleep mode.

Additional modules and state models may be constructed for additional functions as well. For example, a fax model, a network controller model and a finisher model may be constructed for a specific device.

In order to provide an accurate model and simulation, various parameters may be set. For example, the following list of parameters may be used to construct the modules:
 Each function of the device may have only one idle and one job processing state
 The job processing state may be assigned a fixed execution time
 Idle and sleep mode states may include a timeout
 A plurality of sleep modes may be defined
 There may not be a job waiting and a job processing simultaneously Additionally, the transitions between states may have associated constraints. For example, a transition may not end in its origin state. In addition, a transition may be required to lead to another state. In an alternate embodiment, there may be a way to step out of a transition such that there is no final state or endless loop.

Similarly, individual relationships between states may have one or more constraints. For example:
 A sleep mode state may be related to adjacent states by a shutdown or wake-up transition
 A sleep mode state may have at least one wake-up transition
 A sleep mode state may have a shutdown state if it can transition to another sleep state
 A job processing state may have one exit transition
 An idle state may have one transition to a job processing state and one transition to a shutdown state A device may have several energy levels having an associated rank. A lower rank may indicate a higher energy consumption of the device. For example, energy level 1 may be assigned to the idle state and energy level 2 may be assigned to a sleep mode. Each energy level may be assigned a timeout in order to determine how long the device will remain in that energy level before transitioning to the next energy level.

In order to define how and when individual models are used, a job path may be determined for each function of the device. A job path may represent a model chain that is completed in order to finish a job. For example, a print job may include both the module 100 and the module 110 as shown in FIG. 1. Similarly, a scan job may include both the module 100 and the module 120 as shown in FIG. 1.

Figure 2:
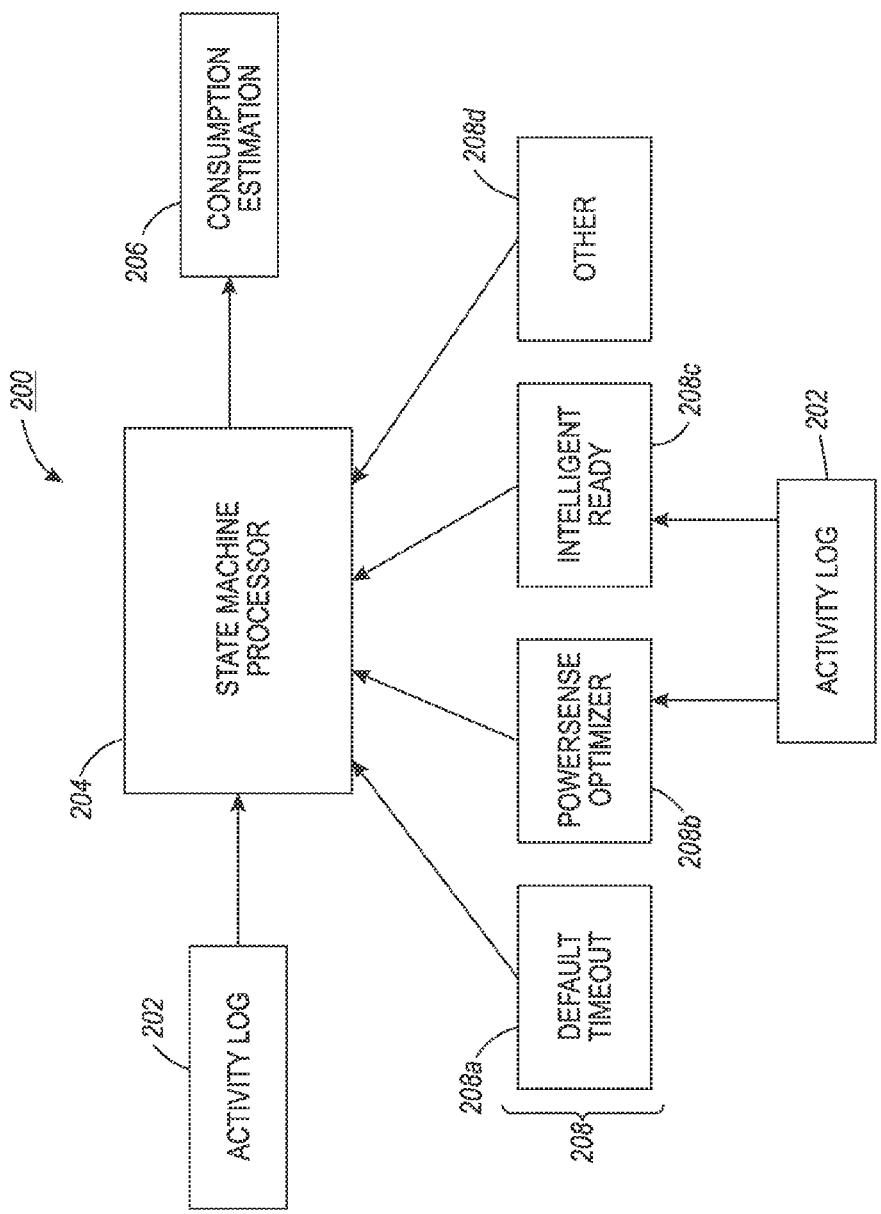
FIG. 2 depicts a simulation engine for simulating power consumption according to an embodiment.

The above-described modules may be used with a simulation engine to estimate power consumption for a device. FIG. 2 illustrates an example of a simulation engine 200 configured to simulate job processing for a device and estimate total power consumption for that job. An activity log 202 may be loaded into a state machine processor 204 along with one or more state machines or modules representing the device, such as the models shown in FIG. 1. The activity log 202 may include a historical listing of real usage of the device. Alternatively, the activity log 202 may include a standard listing of jobs such that multiple devices may be simulated with a common set of activities. The state machine processor 204 may simulate processing the jobs as contained within the activity log 202 using one or more timeout strategies, and output a consumption estimation report 206 showing the modeled power consumption for the device for each of the timeout strategies.

In order to simulate processing the jobs, the state machine processor may load a simulation strategy 208 to perform the jobs. Each simulation strategy 208 may incorporate a different set of rules for transitioning from one state to another when performing one or more jobs. For example, a default timeout strategy 208*a* may cause the state machine processor 204 to simulate the jobs contained within the activity log according to the factory settings of the printing device. A power sensing optimized strategy 208*b*, such as the Simegy® strategy developed by Xerox Corporation, may include a data mining algorithm for optimizing the timeouts of the device according to the analyzed activity log. An intelligent ready strategy 208*c* may be implemented to use previously determined strategies to affect the device timeouts. Other strategies 208*d* may be used as well, such as never transitioning to a sleep mode.

The various strategies 208 may be designed independently from the jobs listed in the activity log 202 so as to determine which strategy is best suited to a particular set of job types. Each strategy 208 may be plugged into the state machine processor 204 to see which timeout strategy results in the least overall power consumption. Additionally, each strategy 208 may be updated over time based upon past activity to optimize the strategy.

Figure 3:
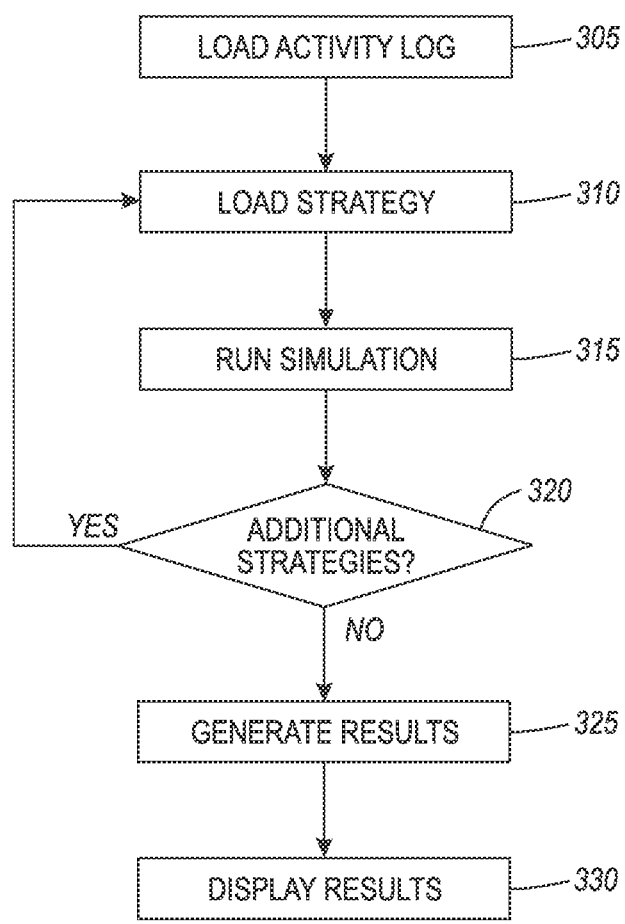
FIG. 3 depicts a flow diagram of an illustrative method of simulating energy consumption according to an embodiment.

FIG. 3 depicts a flow diagram of an illustrative method of simulating job processing with a state machine processor such as state machine processor 204 as shown in FIG. 2. The state machine processor may load 305 an activity log. Similarly, the state machine processor may load 310 a timeout strategy.

The jobs contained within the activity log may be performed by running 315 a simulation according to the loaded 310 strategy. The simulation may take into account the timeout strategy as defined by the loaded 310 strategy as well as other factors such as energy consumption ratings for the device being simulated as well as the energy required for each job listed in the activity log. Additionally, power consumed by the device between jobs may be determined as the device consumes an amount of power when not performing any specific function. After running 315 the first strategy, the state machine processor may determine 320 if there are additional strategies to run. If there are additional strategies, a new strategy is loaded 310 and the simulation is run 315 again.

If there are no additional strategies, a results report may be generated 325. The results report may include the total power consumed by each job during the simulation for each strategy, as well as overall numbers related to total power consumption for the jobs listed in the activity log as simulated for each simulation. The generated 325 results may be compared against actual measured results to determine the accuracy and any associated error for each strategy. In this way, an overall margin of error may be determined. The margin of error may apply to the simulator engine and device model itself. As the timeout strategy may output timeouts to be used for a device at a particular time, device specific errors of consumption may be expected to be similar for any strategy as the consumption errors would be device or simulator specific.

The generated 325 results may be displayed 330 to a user via a display operably connected to the state machine processor, or the results may be output as an electronic file for storage and later access. The generated 325 results may also be compared against previous results to determine if any changes made to one or more strategies have increased or decreased overall power consumption of the device being simulated.

Figure 4:
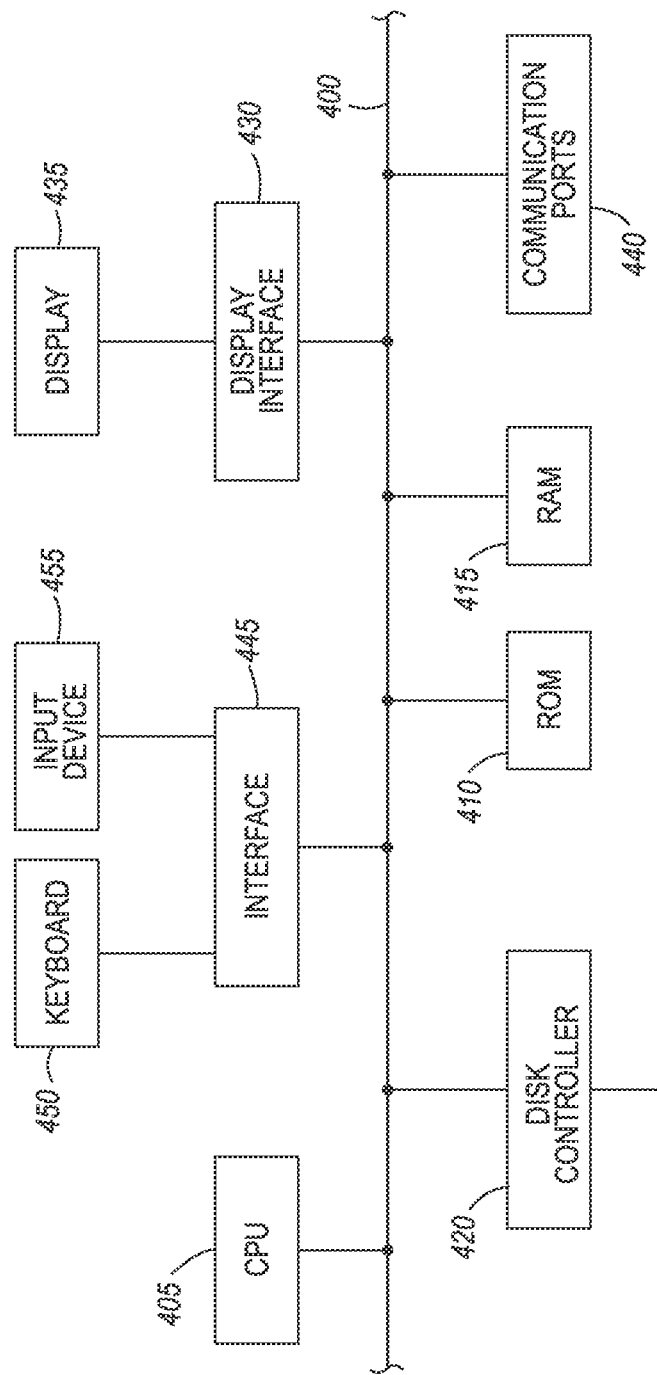
FIG. 4 depicts various embodiments of a computing device for implementing the various methods and processes described herein.

The energy consumption calculations as described above may be performed by an operator of the device at start-up or at determined time intervals. FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the operation of the printer driver(s) above may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 430 may permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A device for simulating energy consumption by a multi-functional printing device, the device comprising:
   a processor; and
   a computer readable medium operably connected to the processor, the computer readable medium containing a set of instructions configured to instruct the processor to:
      load an activity log comprising a plurality of jobs,
      load a first strategy from a plurality of strategies, wherein the first strategy is independent from the jobs in the activity log and comprises a first set of rules for transitioning the printing device from a job processing state to an idle mode state or sleep mode state when performing the jobs,
      perform a first simulation that simulates performing, by the printing device, each of the plurality of jobs according to the first strategy, determine a first amount of power required by the printing device to perform the plurality of jobs during the job processing states according to the first simulation, determine a second amount of power consumed by the printing device between performing the plurality of jobs during the idle mode states and sleep mode states of the first simulation, create a report including estimated power consumption by the multi-functional printing device to complete the plurality of jobs according to the first strategy according to the first simulation, wherein the estimated power consumption comprises the first amount of power and the second amount of power, and cause the report to be displayed.

2. The device of claim 1, wherein the set of instructions further comprises instructions configured to instruct the processor to:

load a second strategy from the plurality of strategies, wherein the second strategy comprises a second set of rules for transitioning the printing device from a job processing state to an idle mode state or sleep mode state when performing the jobs, perform a second simulation that simulates performing the plurality of jobs according to the second strategy, determine a third amount of power required by the printing device to perform the plurality of jobs according to the second strategy during the job processing states of the second simulation, and determine a fourth amount of power consumed by the printing device between performing the plurality of jobs according to the second strategy during the idle modes and sleep modes of the second simulation.

3. The device of claim 2, wherein the set of instructions is further configured to instruct the processor to update the report to include an estimated power consumption of the second simulation by the multi-functional printing device according to the second strategy, wherein the estimated power consumption of the second simulation comprises the third amount of power and the fourth amount of power.

4. The device of claim 1, wherein the first set of rules comprises an assignment of a different energy level to the job processing state, the idle mode, and the sleep mode, and each energy level is assigned a timeout that determines how long the device will remain in an energy level before transitioning to a next energy level.

5. The device of claim 1, wherein the set of instructions is further configured to instruct the processor to:

compare the estimated power consumption to actual measured power consumption results to determine an associated margin of error; and apply the margin of error to a simulation engine for use in a future simulation.

6. The device of claim 1, wherein the set of instructions is further configured to instruct the processor to:

compare the estimated power consumption to previous results to determine whether any changes made to any of the plurality of strategies increased or decreased overall power consumption of the device.

7. The device of claim 1, wherein each of the states has an associated power consumption.

8. The device of claim 1, wherein the first strategy comprises a power sensing optimized strategy for optimizing timeouts of the device according to the activity log.

9. The device of claim 1, wherein the activity log comprises a listing of jobs previously performed by the multi-functional printing device.

10. A method of simulating energy consumption by a multi-functional printing device, the method comprising:

loading, by a processing device, an activity log comprising a plurality of jobs;

loading, by the processing device, a first strategy from a plurality of strategies, wherein the first strategy is independent from the jobs in the activity log and comprises a first set of rules for transitioning the printing device from a job processing state to an idle mode state or sleep mode state when performing the jobs;

by the processing device, performing a first simulation of each of the plurality of jobs at the printing device according to the first strategy;

determining, by the processing device, a first amount of power required by the printing device to perform the plurality of jobs during the job processing states according to the first simulation;

determining, by the processing device, a second amount of power consumed by the printing device between performing the plurality of jobs during the idle mode states and sleep mode states of the first simulation;

creating, by the processing device, a report including estimated power consumption by the multi-functional printing device to complete the plurality of jobs according to the first strategy according to the first simulation, wherein the estimated power consumption comprises the first amount of power and the second amount of power; and causing, by the processing device, the report to be displayed.

11. The method of claim 10, further comprising:

loading, by the processing device, a second strategy from the plurality of strategies, wherein the second strategy comprises a second set of rules for transitioning the printing device from a job processing state to an idle mode state or sleep mode state when performing the jobs, by the processing device, performing a second simulation that simulates performing the plurality of jobs according to the second strategy, determining a third amount of power required by the printing device to perform the plurality of jobs according to the second strategy during the job processing states of the second simulation, and determining a fourth amount of power consumed by the printing device between performing the plurality of jobs according to the second strategy during the idle modes and sleep modes of the second simulation.

12. The method of claim 11, further comprising:

updating, by the processing device, the report to include estimated power consumption of the second simulation by the multi-functional printing device according to the second strategy, wherein the estimated power consumption of the second simulation comprises the third amount of power and the fourth amount of power.

13. The method of claim 10, wherein the first set of rules comprises an assignment of a different energy level to the job processing state, the idle mode, and the sleep mode, and each energy level is assigned a timeout that determines how long the device will remain in an energy level before transitioning to a next energy level.

14. The method of claim 10, further comprising:

comparing the estimated power consumption to actual measured power consumption results to determine an associated margin of error; and applying the margin of error to a simulation engine for use in a future simulation.

15. The method of claim 10, further comprising comparing the estimated power consumption to previous results to determine whether any changes made to any of the plurality of strategies increased or decreased overall power consumption of the device.

16. The method of claim 10, wherein each of the states has an associated power consumption.

17. The method of claim 10, wherein the first strategy comprises a power sensing optimized strategy for optimizing timeouts of the device according to the activity log.

18. The method of claim 10, wherein the activity log comprises a listing of jobs previously performed by the multi-functional printing device.

* * * * *